United States Patent [19]

Schiefer

[11] Patent Number: 4,730,966
[45] Date of Patent: Mar. 15, 1988

[54] EXPANSION BOLT ASSEMBLY

[75] Inventor: Erwin Schiefer, Munich, Fed. Rep. of Germany

[73] Assignee: Hilti Aktiengesellschaft

[21] Appl. No.: 884,997

[22] Filed: Jul. 14, 1986

[30] Foreign Application Priority Data

Jul. 15, 1985 [DE] Fed. Rep. of Germany ....... 3525244

[51] Int. Cl.$^4$ ...................... F16B 13/06; E21D 20/00
[52] U.S. Cl. ..................................... 411/55; 411/418; 405/259
[58] Field of Search ................................... 411/44–48, 411/55, 386, 387, 392, 417, 418, 424; 52/726, 737–739; 10/141 R; 76/101 B; 405/259–261

[56] References Cited

U.S. PATENT DOCUMENTS

| | | |
|---|---|---|
| 1,858,733 | 5/1932 | Flachbart . |
| 3,306,051 | 2/1967 | Howlett ............................... 405/260 |
| 3,316,797 | 5/1967 | Williams .............................. 405/260 |
| 3,347,077 | 10/1967 | Erdelyi ................................ 76/101 B |
| 3,702,060 | 11/1972 | Cumming ............................ 405/261 |
| 3,861,636 | 1/1975 | Diener . |

FOREIGN PATENT DOCUMENTS 0059825 9/1982 European Pat. Off. .
957208 8/1949 France .

Primary Examiner—Neill Wilson
Attorney, Agent, or Firm—Toren, McGeady & Associates

[57] ABSTRACT

An expansion bolt assembly includes an anchor bolt with a conically shaped expansion head at one end arranged to be drawn into an expansion sleeve. At the opposite end, the anchor bolt forms a plurality of axially extending projections protruding radially outwardly from the anchor bolt shank. The axially extending projections are spaced circumferentially apart around the anchor bolt and the outer surface of the projections are threaded to receive a nut. The anchor bolt can be produced in an extrusion process with great material economy.

10 Claims, 3 Drawing Figures

EXPANSION BOLT ASSEMBLY

BACKGROUND OF THE INVENTION

The present invention is directed to an expansion bolt assembly including an anchor bolt and an expansion sleeve with a conically shaped expansion head on one end of the anchor bolt for expanding the expansion sleeve. The anchor bolt has a cylindrical shank extending from the expansion head located at one end toward the opposite end with the diameter of the shank corresponding to the smallest diameter of the expansion head. At the opposite end from the expansion head, means are provided for attaching a load to the anchor bolt.

Expansion bolt assemblies as described above are distinguished by a simple construction and simple installation. By pulling the anchor bolt in the direction opposite to its insertion direction into a borehole, the conically shaped expansion head is moved into the expansion sleeve and, in turn, the sleeve is spread radially outwardly into anchoring contact with the borehole surface.

In a known expansion bolt assembly, means for securing a load to the bolt is provided by a thread formed on the anchor bolt. The region on which the thread is formed is on the outer surface of the cylindrical shank so that the shank extends between the thread and the expansion head on the opposite end of the bolt.

Compared to the nominal diameter of the thread and the tensile strength of the axial region of the bolt on which the thread is formed, the anchor bolt is overdimensioned. In other words, the anchor bolt requires an unnecessarily high amount of material during fabrication. In addition to the cost of the material forming the bolt, the additional material results in an increased weight of the bolt.

SUMMARY OF THE INVENTION

Therefore, the primary object of the present invention is to provide an expansion bolt assembly including an anchor bolt and an expansion sleeve which is easy to install, has a simple construction, and affords production of the anchor bolt with a small material expenditure.

In accordance with the present invention, the region of the anchor bolt on which the load engagement means are formed protrudes radially outwardly from the shank of the bolt in the form of radial projections with the circumferentially extending surfaces of the projections carrying a male thread. The projections are uniformly spaced around the circumference of the anchor bolt.

The production of the anchor bolt, preferably formed of metal, is appropriately effected by extrusion. A cylindrical blank with a cross-sectional area corresponding to the anchor bolt shank serves as the original workpiece for producing the anchor bolt. An expansion head is shaped on one end of the shank in an upsetting operation, while the opposite end of the shank is shaped by radial deformation with axially extending indentations or recesses formed between the projections with the recesses extending parallel to the shank axis. The external thread on the individual projections can be formed in a rolling process with the threads being formed as arc segments on the surface of the projections. The reduced carrying capacity of the thread formed on the projections is acceptable, since the failure criterion is determined by the transverse cross-sectional area of the shank. The anchor bolt of the expansion bolt assembly according to the present invention can be produced with a material savings of up to 50% as compared with known anchor bolts.

Preferably, the transverse cross-sectional area of the end portion of the anchor bolt on which the external thread is formed corresponds approximately to the transverse cross-sectional area of the shank. The formation of the axially extending projections is achieved in a simple manner by the material displaced in the formation of the indentations or recesses in the end of the shank so that the material displaced moves radially outwardly forming the projections. Due to the equal cross-sectional areas of the shank and of the axially extending region forming the projections, an adequate carrying capacity of the region forming the thread is assured.

In one embodiment of the invention, the outside diameter of the thread on the projections corresponds to 1.2 to 1.7 times the shank diameter, and preferably to 1.5 times. Such a dimensional relation assures considerable economy in the amount of material employed and affords a high load carrying capacity for the anchor bolt region on which the thread is formed.

In accordance with another feature of the invention, the thread is arranged on circular arc surfaces provided by the projections which extend concentrically to the anchor bolt shank axis. The thread is formed on relatively long arc segments so that high load carrying capacities of the thread are available and the attachment of a nut onto the thread is facilitated.

Preferably, the thread on the outside surface of the projections extends along an arc describing an angle of 90° to 200°, and preferably extending for an angle of 120° to 180° on the projections.

Still another feature of the invention is the provision of at least two and preferably three projections spaced angularly apart around the anchor bolt axis. While the use of two projections affords a particularly simple production operation, the use of three projections affords an improved threading of the nut onto the projections which is less prone to the hazard of canting.

In a preferred arrangement, the indentations or recesses between the projections are in the form of fluted surfaces with a concave base as viewed in transverse cross-section with the fluted surfaces extending parallel to the anchor bolt shank axis. As a result, the projections are interconnected in a bending-resistant manner, since any notch action is prevented by the concave base of the fluted surfaces.

The expansion sleeve can be held on the shank of the anchor bolt against displacement toward its trailing end, that is, the end with the projections, by providing abutment means in the form of protuberances on the shank surface. It is also possible to extend the expansion sleeve toward the trailing end of the anchor bolt to obtain the desired holding action and to support the sleeve against the nut to be secured onto the thread on the trailing end of the bolt. The extension of the expansion sleeve can be provided by support fingers running from the sleeve to the trailing end of the bolt with the fingers extending through the fluted surfaces between the projections and, therefore, between the threads on the projections.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
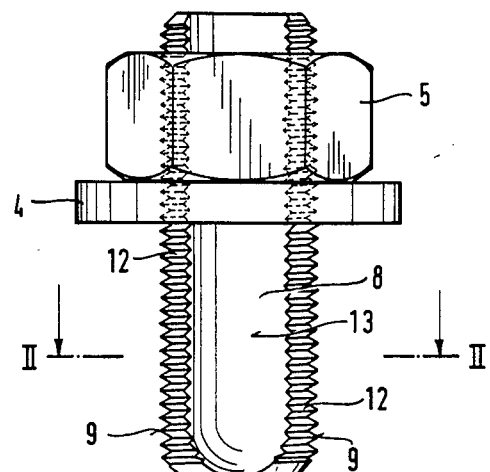
FIG. 1 is an elevational view of an expansion bolt assembly embodying the present invention shown partly in axially extending section.

An expansion bolt assembly 1 is shown in FIG. 1 and includes an axially elongated anchor bolt 2 with a first end at its lower end and a second end at its upper end as viewed in FIG. 1. An expansion sleeve 3 extends laterally around said anchor bolt and extends for a part of the axial length of the bolt. At the second end of the bolt there is a washer 4 and a nut 5.

The anchor bolt 2 is made up of a conically shaped expansion head 6 located at its first end, a cylindrical shank 7 extending from the smallest diameter end of the expansion head 6 toward the second end of the anchor bolt and an axially extending second end portion 8 with a thread 9 formed in the circumferentially extending surface of the portion 8. The surface of the shank 7 is provided with protuberances 11 for preventing the axial displacement of the expansion sleeve 3 toward the second end of the anchor bolt when the anchor bolt is inserted into a borehole.

The second end portion 8 has a pair of projections 12 protruding radially outwardly from the shank 7 and extending in the axial direction of the shank. The projections 12 are formed in the course of producing the fluted surfaces 13 in the second end portion of the shank. As the fluted surfaces 13 are formed in the second end portion 8 the material displaced moves radially outwardly defining the projections 12.

Figure 2:
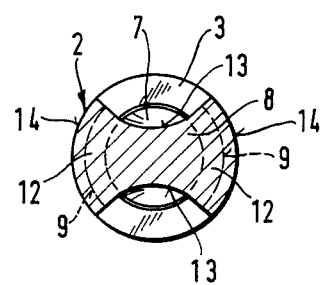
FIG. 2 is a sectional view of the expansion bolt assembly displayed in FIG. 1 taken along the line II—II.
Figure 3:
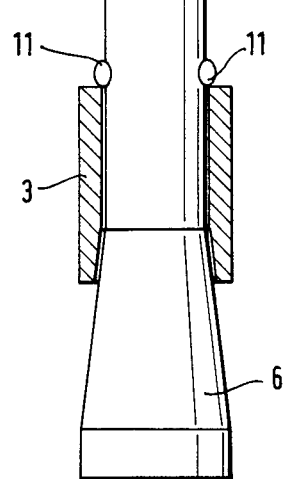
FIG. 3 is a transverse sectional view, similar to FIG. 2, through another embodiment of the invention.
Figure 3:
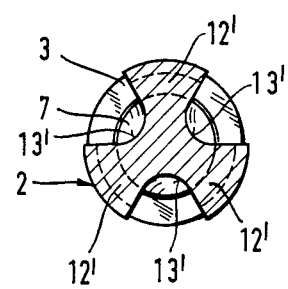

As indicated in FIG. 2, two diametrically located projections 12 are formed in the second end portion 8 and each projection has the same shape. The circumferentially extending surfaces of the projections 12 form circular arc surfaces 14 concentric with the axis of the shank with the thread 9 formed in the circular arc surfaces. In FIG. 3 another embodiment of the second end portion 8 is displayed with three axially spaced projections 12' spaced apart by the fluted surfaces 13'.

While specific embodiments of the invention have been shown and described in detail to illustrate the application of the inventive principles, it will be understood that the invention may be embodied otherwise without departing from such principles.

I claim:

1. An expansion bolt assembly comprising an axially elongated anchor bolt having a first end and a second end, said anchor bolt includes an axially extending conically shaped expansion head formed on the first end of the anchor bolt with the axially extending conically shaped surface of said expansion head tapering inwardly from the first end toward the second end of said anchor bolt, a shank extending from the smallest diameter end of said expansion head toward the second end of said anchor bolt, and axially extending second end portion of said anchor bolt located between said shank and the second end of said anchor bolt, said second end portion having means thereon for attaching a load to said anchor bolt, an expansion sleeve laterally enclosing said shank and arranged to be expanded by said expansion head, wherein the improvement comprises that said second end portion comprises a plurality of angularly spaced axially extending projections protruding radially outwardly from said shank and being uniformly spaced apart around the axis of said anchor bolt, each said projection having a radially outer axially extending surface, said projections being spaced apart by axially extending indentations coextensive with said projections with said indentations located radially inwardly of said projections, said means for attaching a load to said anchor bolt comprises a thread extending circumferentially around said radially outer surfaces of said projections with said thread interrupted by said indentations, and a nut engageable with said thread for securing a load to said anchor bolt.

2. An expansion bolt assembly, as set forth in claim 1, wherein the cross-sectional area of the second end portion extending transversely of the axial direction of said anchor bolt corresponds approximately to the transverse cross-section area of the shank located between said expansion head and said second end portion.

3. An expansion bolt assembly, as set forth in claim 1 or 2, wherein the diameter of the radially outer surfaces of said end portion being in the range of 1.2 to 1.7 times the diameter of said shank between said expansion head and said second end portion.

4. An expansion bolt assembly, as set forth in claim 3, wherein the diameter of the circumference of said projections is approximately 1.5 times the diameter of said shank extending between said expansion head and said second end portion.

5. An expansion bolt assembly, as set forth in claim 1 or 2, wherein the radially outer surface of said projections extends along a circular arc concentric to the axis of said anchor bolt.

6. An expansion bolt assembly, as set forth in claim 1 or 2, wherein said radially outer surface of said projections extends along an arc describing an angle of 90° to 200°.

7. An expansion bolt assembly, as set forth in claim 6, wherein the radially outer surface of said projections extends along an arc in the range of 120° to 180° relative to the axis of said anchor bolt.

8. An expansion bolt assembly, as set forth in claim 1 or 2, wherein at least two said projections are formed on said second end portion of said anchor bolt.

9. An expansion bolt assembly, as set forth in claim 1 or 2, wherein three said projections are formed around said second end portion of said anchor bolt.

10. An expansion bolt assembly, as set forth in claim 1 or 2, wherein said indentations have a concave fluted surface, with said indentations extending parallel to the axis of said anchor bolt.

* * * * *